United States Patent
Zhao et al.

(10) Patent No.: US 10,305,310 B2
(45) Date of Patent: May 28, 2019

(54) METHOD AND APPARATUS FOR CONTROLLING BATTERY CELL CHARGING-DISCHARGING

(71) Applicant: Lenovo (Beijing) Co., Ltd., Beijing (CN)

(72) Inventors: Shuangcheng Zhao, Beijing (CN); Weizhi Lin, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 48 days.

(21) Appl. No.: 15/498,169

(22) Filed: Apr. 26, 2017

(65) Prior Publication Data

US 2018/0006469 A1    Jan. 4, 2018

(30) Foreign Application Priority Data

Jun. 30, 2016  (CN) .......................... 2016 1 0509976

(51) Int. Cl.
*H02J 7/00* (2006.01)
*H01M 10/44* (2006.01)
*H01M 10/48* (2006.01)

(52) U.S. Cl.
CPC .......... *H02J 7/007* (2013.01); *H01M 10/443* (2013.01); *H01M 10/486* (2013.01); *H01M 2200/10* (2013.01); *H01M 2220/30* (2013.01)

(58) Field of Classification Search
CPC .... H02J 7/007; H01M 10/486; H01M 10/443; H01M 2200/10; H01M 2220/30
USPC ........................................................ 320/134
See application file for complete search history.

(56) References Cited

U.S. PATENT DOCUMENTS

| 6,124,698 | A  | * | 9/2000 | Sakakibara | H02J 7/008 320/110 |
| 6,515,452 | B2 | * | 2/2003 | Choo | G01R 31/3624 320/132 |
| 6,556,020 | B1 | * | 4/2003 | McCabe | G01R 31/3662 320/132 |
| 7,795,821 | B2 | * | 9/2010 | Jun | G09G 3/3426 315/149 |
| 9,709,633 | B2 | * | 7/2017 | Arizono | G01R 31/3689 |

(Continued)

FOREIGN PATENT DOCUMENTS

| CN | 101411035 A | 4/2009 |
| CN | 101449445 A | 6/2009 |

(Continued)

*Primary Examiner* — M Baye Diao
(74) *Attorney, Agent, or Firm* — Anova Law Group, PLLC (57) ABSTRACT

A method includes detecting a present temperature value of a battery cell of a battery, determining whether the present temperature value is higher than a lowest threshold temperature value and lower than a highest threshold temperature value, detecting a present electric current value of the battery in association with a determination that the present temperature value is higher than the lowest threshold temperature value and lower than the highest threshold temperature value, determining whether the present electric current value is higher than a threshold current value corresponding to the present temperature value, and stopping a charge-discharge process of the battery cell in response to determining that the present electric current value is higher than the threshold current value.

20 Claims, 6 Drawing Sheets

(56) References Cited

U.S. PATENT DOCUMENTS

| | | | | |
|---|---|---|---|---|
| 10,056,778 B2* | 8/2018 | Kratzer | ............... | B60L 3/12 |
| 2005/0137823 A1* | 6/2005 | Becker-Irvin | ......... | H02J 7/0091 |
| | | | | 702/130 |
| 2009/0085527 A1* | 4/2009 | Odaohhara | ........... | H02J 7/0091 |
| | | | | 320/150 |
| 2010/0007310 A1* | 1/2010 | Kawamoto | ......... | H01M 10/425 |
| | | | | 320/134 |
| 2010/0109611 A1* | 5/2010 | Schaefer | ........... | H01M 10/0525 |
| | | | | 320/134 |
| 2011/0199053 A1* | 8/2011 | Minamiura | ......... | H01M 10/441 |
| | | | | 320/136 |
| 2013/0132742 A1* | 5/2013 | Zhao | ................... | H02J 7/0073 |
| | | | | 713/300 |
| 2015/0108950 A1* | 4/2015 | Yun | ..................... | H02J 7/0068 |
| | | | | 320/134 |
| 2015/0362557 A1* | 12/2015 | Takashima | ............ | G01R 31/44 |
| | | | | 324/426 |
| 2016/0134226 A1* | 5/2016 | Najima | .................. | H02P 29/68 |
| | | | | 318/472 |

FOREIGN PATENT DOCUMENTS

| | | |
|---|---|---|
| CN | 101969214 A | 2/2011 |
| CN | 102355021 A | 2/2012 |
| CN | 103683388 A | 3/2014 |

\* cited by examiner

METHOD AND APPARATUS FOR CONTROLLING BATTERY CELL CHARGING-DISCHARGING

CROSS-REFERENCES TO RELATED APPLICATION

This application claims priority to Chinese Patent Application No. 201610509976.0, filed on Jun. 30, 2016, the entire contents of which are hereby incorporated by reference.

TECHNICAL FIELD

The present disclosure generally relates to the field of battery technologies and, more particularly, to a method and apparatus for battery cell protection.

BACKGROUND

Currently, laptop battery batteries use Thermal Cut Off (TCO) breakers, i.e., thermal fuses, for overtemperature/overcurrent protection. At a certain ambient temperature, when the charge-discharge current of the battery cell is greater than a set threshold value, the TCO breaker triggers protection and disconnects the battery cell, i.e., because the heat accumulation of the TCO breaker exceeds the threshold value and results in a bimetallic reversal bounce. When the TCO temperature drops below a certain temperature, the TCO breaker is closed. The TCO breaker functions as the overtemperature/overcurrent protection of the battery overcurrent. At a low temperature, the TCO breaker allows relatively high charge-discharge current. At a high temperature, the TCO breaker allows relatively low charge-discharge current. Thus, safety issues of battery cells caused by high charge-discharge at a high temperature can be avoided.

However, the current TCO breaker for overtemperature/overcurrent protection has following issues. For example, the TCO module to implement a TCO breaker is costly, and the TCO module (containing a TCO body and a welded nickel piece) can cause high power consumption due to its own high impedance during the charge-discharge process. Further, affected by the heat generated by the TCO module, the accuracy of the temperature/current protection can be poor, which seriously affects the battery discharge performance.

SUMMARY

One aspect of the disclosure provides a method including detecting a present temperature value of a battery cell of a battery, determining whether the present temperature value is higher than a lowest threshold temperature value and lower than a highest threshold temperature value, detecting a present electric current value of the battery in association with a determination that the present temperature value is higher than the lowest threshold temperature value and lower than the highest threshold temperature value, determining whether the present electric current value is higher than a threshold current value corresponding to the present temperature value, and stopping a charge-discharge process of the battery cell in response to determining that the present electric current value is higher than the threshold current value.

Another aspect of the disclosure provides an apparatus including a controller, a temperature detector coupled to the controller, and a current detector coupled to the controller. The temperature detector detects a present temperature value of a battery cell of a battery. The current detector detects a present electric current value of the battery. The controller determines whether the present temperature value is higher than a lowest threshold temperature value and lower than a highest threshold temperature value and, in association with a determination that the present temperature value is higher than the lowest threshold temperature value and lower than the highest threshold temperature value, determines a present electric current value. The controller further determines whether the present electric current value is higher than a threshold current value corresponding to the present temperature value and, in response to determining that the present electric current value is higher than the threshold current value, controls to stop a charge-discharge process of the battery cell.

Another aspect of the disclosure provides an apparatus including a battery, a processor powered by the battery, a memory, a temperature detector coupled to the processor, and a current detector coupled to the processor. The temperature detector detects a present temperature value of a battery cell of the battery and the current detector detects a present electric current value of the battery. Code stored in the memory and executed by the processor determines whether the present temperature value is higher than a lowest threshold temperature value and lower than a highest threshold temperature value, determines a present electric current value in association with a determination that the present temperature value is higher than the lowest threshold temperature value and lower than the highest threshold temperature value, determines whether the present electric current value is higher than a threshold current value corresponding to the present temperature value, and controls to stop a charge-discharge process of the battery cell in response to determining that the present electric current value is higher than the threshold current value.

Other aspects of the present disclosure can be understood by those skilled in the art in light of the description, the claims, and the drawings of the present disclosure.

BRIEF DESCRIPTION OF THE DRAWINGS

The drawings described below only show some embodiments of the present disclosure, and it is possible for those ordinarily skilled in the art to derive other drawings from these drawings without creative effort.

DETAILED DESCRIPTION

Hereinafter, embodiments consistent with the disclosure will be described with reference to the drawings. Wherever possible, the same reference numbers will be used throughout the drawings to refer to the same or like parts. The described embodiments are merely a part of, rather than all of, the embodiments of the present disclosure. On the basis of the disclosed embodiments, other embodiments obtainable by those ordinarily skilled in the art without creative effort shall fall within the scope of the present disclosure.

Figure 1:
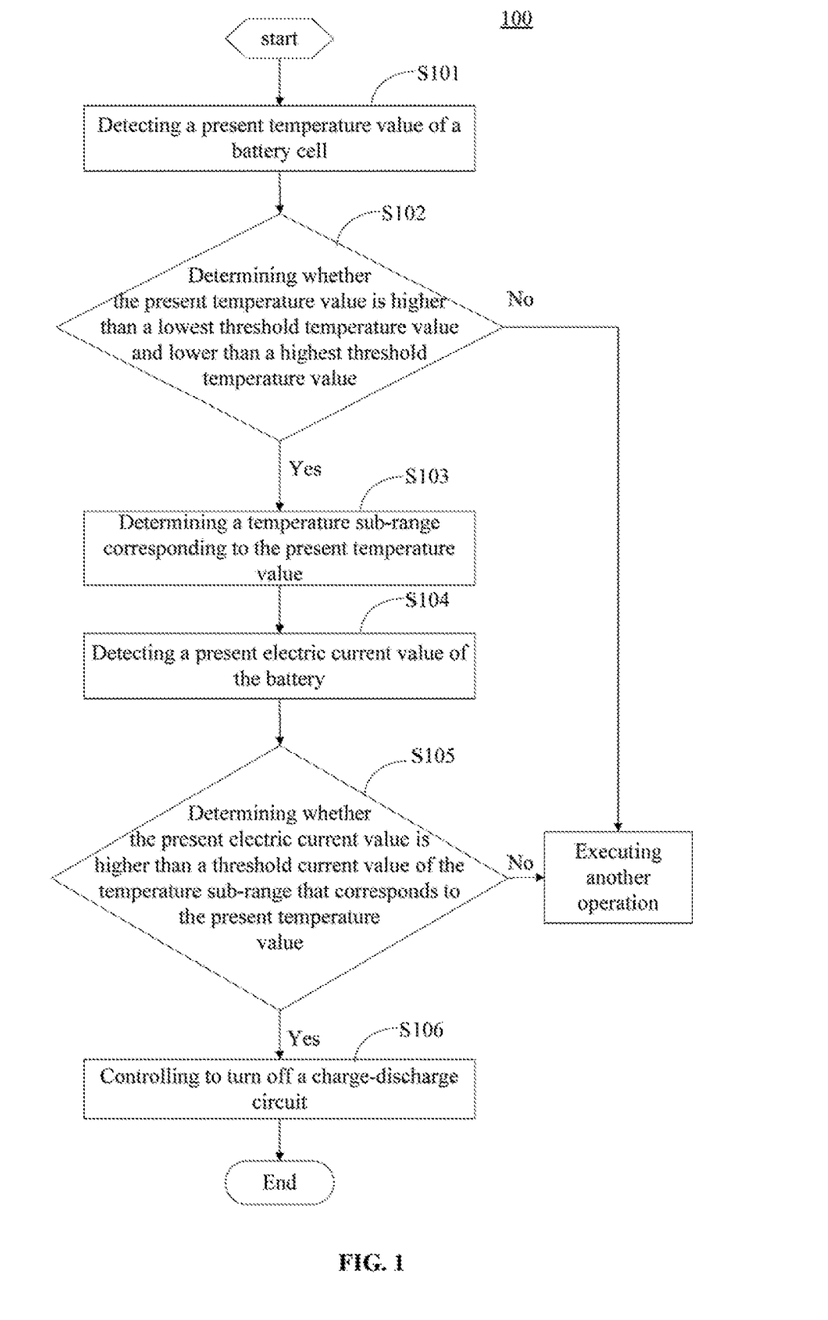
FIG. 1 illustrates a flow chart of an example of method for battery cell overcurrent protection consistent with embodiments of the present disclosure.

Embodiments of the present disclosure provide a method for battery cell overcurrent protection. FIG. 1 illustrates a flow chart of an example of method for battery cell overcurrent protection consistent with the disclosure. As shown in FIG. 1, at S101, a present temperature value of a battery cell is detected. At S102, it is determined whether the present temperature value is higher than a lowest threshold temperature value and lower than a highest threshold temperature value. At S103, when the present temperature value is higher than the lowest threshold temperature value and lower than the highest threshold temperature value, a temperature sub-range corresponding to the present temperature value is determined. In this disclosure, a temperature sub-range corresponding to the present temperature value refers to the temperature sub-range within which the present temperature value falls. At S104, a present electric current value of the battery is detected. At S105, it is determined whether the present electric current value is higher than a threshold current value of the temperature sub-range corresponding to the present temperature value. At S106, when the present electric current value is higher than the threshold current value of the present temperature value, a charge-discharge circuit is turned off.

When it is determined that the present temperature value is lower than the lowest threshold temperature value or higher than a highest threshold temperature value, processes S103-S106 may not need to be performed and, as shown in FIG. 1, another operation may be executed. Also, when it is determined that the present electric current value is lower than or equal to the threshold current value of the temperature sub-range that corresponds to the present temperature value, process S106 may not need to be performed and, as shown in FIG. 1, another operation may be executed. Turning off the charge-discharge circuit may stop the charge-discharge process of the battery cell.

According to the disclosed method for battery cell overcurrent protection, the present temperature of the battery cell may be detected and the temperature sub-range of the present temperature may be determined. Based on the sub-temperature range, when the present electric current is higher than the current-protection threshold value corresponding to the temperature sub-range, a protection mechanism may be started. The disclosed method for battery cell overcurrent protection may replace the TCO protection method in the conventional technology. The disclosed method may be less costly. The battery resistance and power consumption of the battery may be reduced if the disclosed method is applied. Further, the accuracy of battery cell overcurrent protection may be improved. Further, the disclosed method and circuit for battery cell overcurrent protection may be compatible with or may support high-power discharge in a battery cell.

Figure 2:
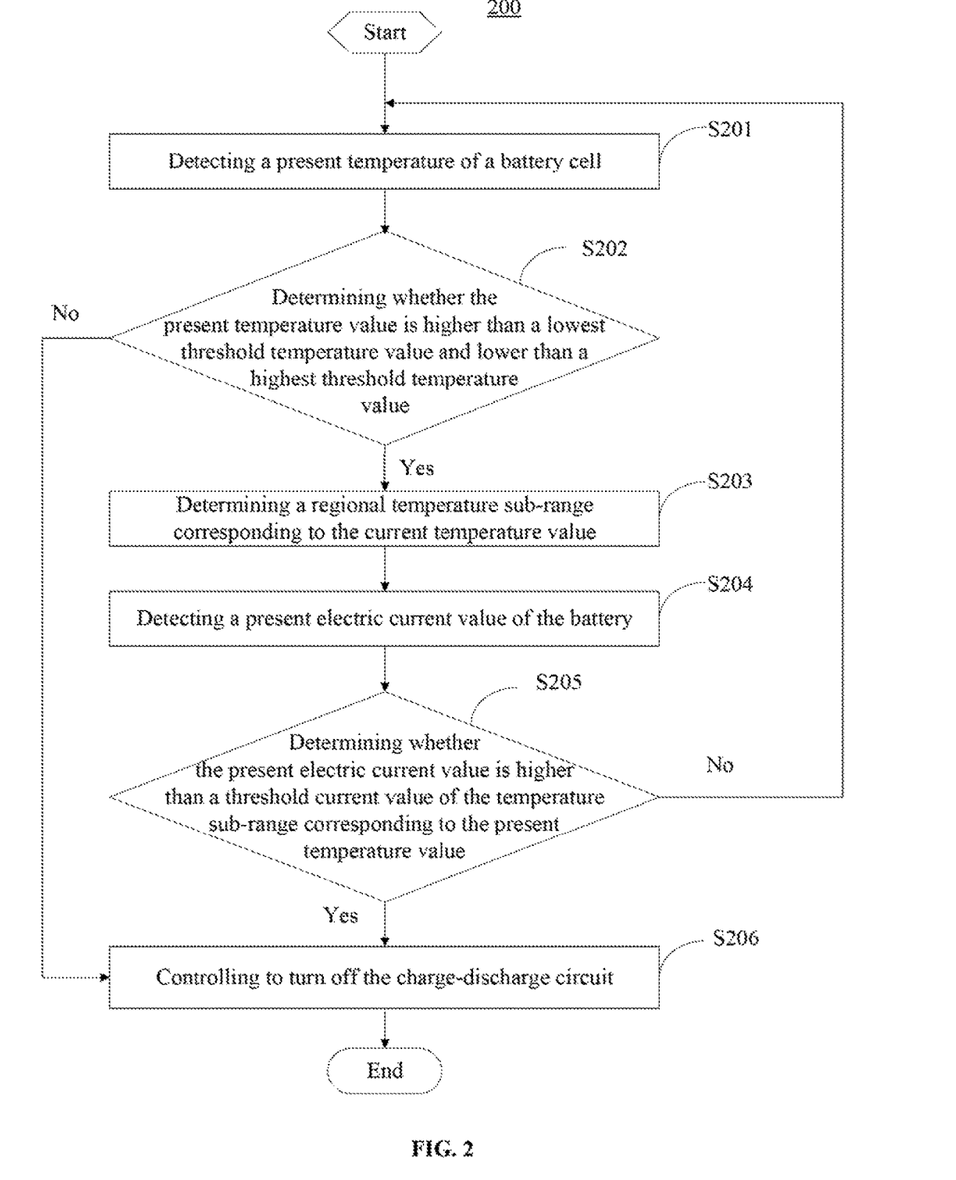
FIG. 2 illustrates a flow chart of another example of method for battery cell overcurrent protection consistent with embodiments of the present disclosure.

FIG. 2 illustrates a flow chart of another example of method for battery cell overcurrent protection 200. As shown in FIG. 2, at S201, a present temperature value of a battery cell is detected. In some embodiments, a thermistor arranged on a surface of the battery cell may be used to detect the present temperature value of the battery cell in real-time.

At S202, it is determined whether the present temperature value is higher than a lowest threshold temperature value and lower than a highest threshold temperature value. If the present temperature value is higher than the lowest threshold temperature value and lower than the highest threshold temperature value, the process proceeds to S203. Otherwise, the process proceeds to S206.

In some embodiments, the lowest threshold temperature value and the highest threshold temperature value may be predetermined. The temperature range between the lowest threshold temperature value and the highest threshold temperature value may be divided into a plurality of temperature sub-ranges, and a temperature sub-range may correspond to a threshold current value. In some embodiments, the threshold current values may be predetermined. In various embodiments, the temperature sub-ranges and the threshold current values may be flexibly adjusted, depending on the safety requirements of the battery cell.

At S203, when the present temperature value is higher than the lowest threshold temperature and lower than the highest threshold temperature, the temperature sub-range corresponding to the present temperature value is determined.

At S204, a present electric current value of the battery is detected. In some embodiments, a precision resistor may be used to detect the present electric current of the battery.

At S205, it is determined whether the present electric current value is higher than the threshold current value of the temperature sub-range corresponding to the present temperature value. If the present electric current value is higher than the threshold current value of the temperature sub-range corresponding to the present temperature value, the process proceeds to S206. Otherwise, the process returns to S201.

At S206, the charge-discharge circuit is controlled to be turned off. In some embodiments, the charge-discharge circuit may include a metal-oxide-semiconductor field-effect transistor (MOSFET). Accordingly, when the present electric current value is higher than the threshold current value corresponding to the present temperature value, the MOSFET may be controlled to be turn off.

In some embodiments, after turning off the charge-discharge circuit, the disclosed method for battery cell overcurrent protection may further include, when the present temperature value of the battery cell and the present electric current value of the battery satisfy a predetermined condition, controlling the charge-discharge circuit to be turned on.

Figure 3:
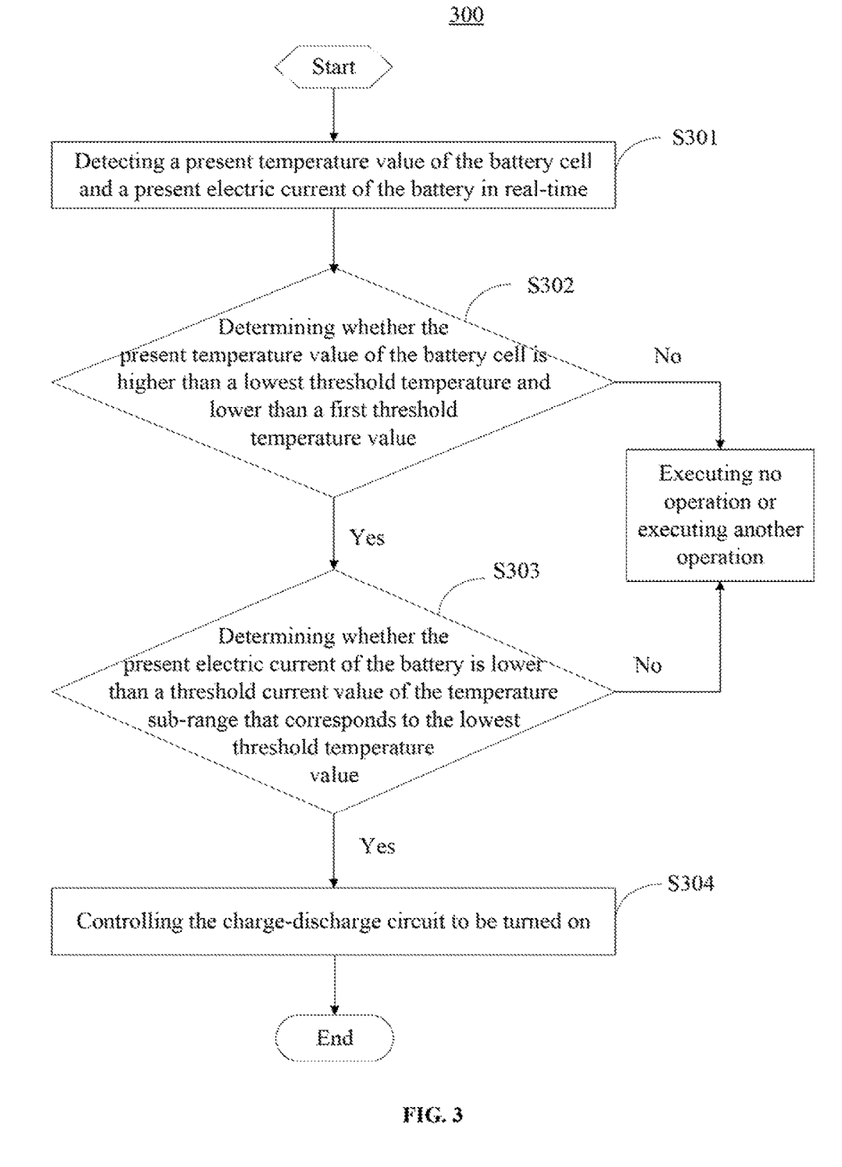
FIG. 3 illustrates a flow chart of another example of method for battery cell overcurrent protection consistent with embodiments of the present disclosure.

FIG. 3 illustrates a flow chart of an example of method for battery cell overcurrent protection 300. The method 300 is directed to controlling the charge-discharge circuit to be turned on when the present temperature value of the battery cell and the present electric current value of the battery satisfy the predetermined condition.

As shown in FIG. 3, at S301, the present temperature value of the battery cell and the present electric current of the battery are detected in real-time.

At S302, it is determined whether the present temperature value of the battery cell is higher than a lowest threshold temperature and lower than a first threshold temperature value. When the present temperature value of the battery cell is higher than the lowest threshold temperature and lower than the first threshold temperature value, the process proceeds to S303. The first threshold temperature value may be the maximum temperature value in the temperature sub-range that corresponds to the lowest threshold temperature value, and is also referred to as a "regional threshold temperature value."

At S303, it is determined whether the present electric current of the battery is lower than a threshold current value of the temperature sub-range that corresponds to the lowest threshold temperature value. When the present electric current of the battery is lower than the threshold current value of the temperature sub-range that corresponds to the lowest threshold temperature value, the process proceeds to S304.

At S304, the charge-discharge circuit is controlled to be turned on.

When the present temperature value of the battery cell is lower than the lowest threshold temperature or higher than the first threshold temperature value, processes S303 and S304 may not need to be performed and, as shown in FIG. 3, another operation may or may not be executed. Also, when the present electric current of the battery is higher than or equal to the threshold current value of the temperature sub-range that corresponds to the lowest threshold temperature value, process S304 may not need to be performed and, as shown in FIG. 3, another operation may or may not be executed.

Figure 4:
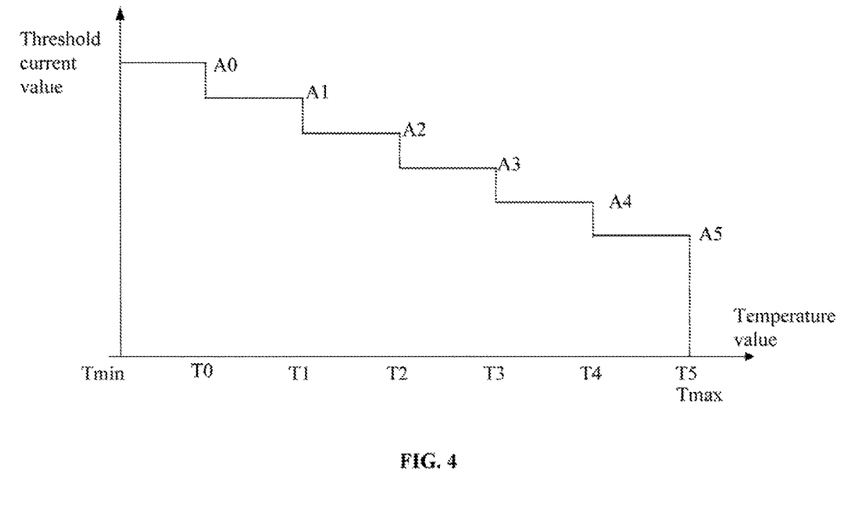
FIG. 4 illustrates an exemplary correspondence relationship between a temperature sub-range of a battery cell and a threshold temperature value.

FIG. 4 illustrates an example to explain the aforementioned embodiments. As shown in FIG. 4, according to the safety requirements, the lowest threshold temperature value Tmin and the highest threshold temperature value Tmax may be determined in advance. The temperature range between the lowest threshold temperature value Tmin and the highest threshold temperature value Tmax are divided into six temperature sub-ranges. That is, six temperature sub-ranges may be predetermined. A temperature sub-range may correspond to a threshold current value. Specifically, the six temperature sub-ranges may include a first temperature sub-range (Tmin-T0), a second temperature sub-range (T0-T1), a third temperature sub-range (T1-T2), a fourth temperature sub-range (T2-T3), a fifth temperature sub-range (T3-T4), and a sixth temperature sub-range (T4-Tmax/T5). The threshold current value corresponding to the first temperature sub-range may be A0, the threshold current value corresponding to the second temperature sub-range may be A1, the threshold current value corresponding to the third temperature sub-range may be A2, the threshold current value corresponding to the fourth temperature sub-range may be A3, the threshold current value corresponding to the fifth temperature sub-range may be A4, and the threshold current value corresponding to the sixth temperature sub-range may be A5.

First, the present temperature value of the battery cell may be detected. If the present temperature is higher than the lowest threshold temperature value and lower than the highest threshold temperature value, it may be determined which temperature sub-range, among the six temperature sub-ranges, the present temperature value falls in. Assuming the present temperature value falls in or corresponds to the second temperature sub-range (T0-T1), it may be determined that the threshold current value corresponding to the present temperature value may be A1.

Further, the present electric current value of the battery may be detected. If the present electric current of the battery is higher than the threshold current value A1 that corresponds to the second temperature sub-range (T0-T1), the charge-discharge circuit, e.g., the MOSFET, may be controlled to be turned off. That is, overcurrent protection may be started.

Further, if the present electric current value is higher than or equal to the highest threshold temperature value Tmax, or is lower than or equal to the lowest threshold temperature value Tmin, the charge-discharge circuit, e.g., the MOSFET, may be controlled to be turned off.

After the overcurrent protection is started, the temperature value of the battery cell and the electric current value of the battery may continue to be monitored. When the temperature value of the battery cell is higher than the lowest threshold temperature value Tmin and lower than T0, and the electric current value of the battery is lower than A0, the charge-discharge circuit may be controlled to be turned on again, and the battery may return to normal operation. In some embodiments, the temperature value of the battery cell and the electric current value of the battery may continue to be monitored until the temperature value of the battery cell is higher than the lowest threshold temperature value Tmin and lower than T0, and the electric current value of the battery is lower than A0.

According to the disclosed method for battery cell overcurrent protection, different current-protection threshold values may be arranged for different temperature sub-ranges based on the safety requirements of the battery cell. When the present temperature value of the battery cell falls in a certain temperature sub-range, if the present electric current of the battery is higher than the current-protection threshold value corresponding to the temperature sub-range, overcurrent protection may be started. After the overcurrent protection has been started, the temperature value of the battery cell and the electric current value of the battery may continue to be monitored to determine whether the conditions to turn on the charge-discharge circuit are satisfied. When the conditions are satisfied, the charge-discharge circuit may be controlled to be turned on again, and the battery may return to normal operations. The disclosed method for battery cell overcurrent protection may replace the TCO protection method in the conventional technology, and is less costly. The battery resistance and power consumption of the battery may be reduced. The accuracy of the battery cell overcurrent protection may be improved. Further, the disclosed method and circuit for battery cell overcurrent protection may support high-power discharge in a battery and improves the battery performance. In some embodiments, the disclosed method may avoid adverse effects caused by leakage current when the overcurrent protection is triggered in the conventional technology.

Figure 5:
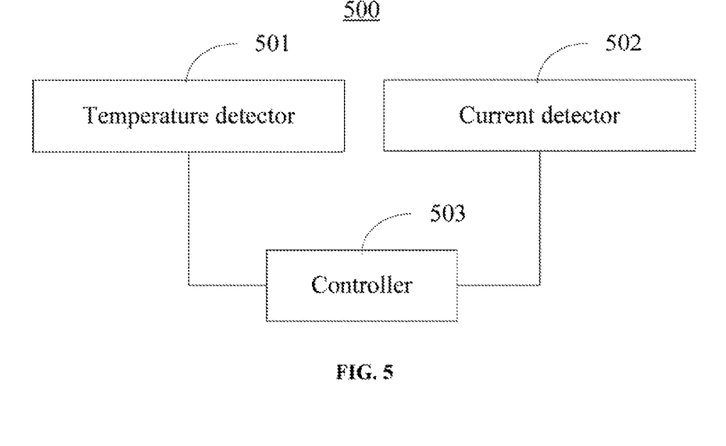
FIG. 5 illustrates a structural diagram of an example of circuit for battery cell overcurrent protection consistent with embodiments of the present disclosure.

Embodiments of the present disclosure further provide a circuit for battery cell overcurrent protection. FIG. 5 illustrates a structure of an example of circuit 500 for battery cell overcurrent protection. As shown in FIG. 5, the circuit 500 includes a temperature detector 501, a current detector 502, and a controller 503 coupled to the temperature detector 501 and the current detector 502. The temperature detector 501 may detect a present temperature value of the battery cell in real-time. The current detector 502 may detect the present electric current value of the battery in real-time. The controller 503 may determine whether the present temperature value of the battery cell, detected by the temperature detector 501, is higher than a lowest threshold temperature value and lower than a highest threshold temperature value. The controller 503 may also, when the present temperature value of the battery cell is higher than the lowest threshold temperature value and lower than the highest threshold temperature value, determine a temperature sub-range within which the present temperature value falls, and determine whether the present electric current value of the battery, detected by the current detector 502, is higher than a threshold current value of the temperature sub-range corresponding to the present temperature value. When the present electric current value of the battery is higher than the threshold current value of the temperature sub-range, the controller 503 may control the charge-discharge circuit, coupled to the controller 503, to be turned off.

According to the disclosed circuit for battery cell overcurrent protection, the temperature sub-range in which the present temperature value of the battery cell falls in may be determined based on the present temperature value of the battery cell. When the present electric current value of the battery is higher than the current-protection threshold value corresponding to the temperature sub-range, overcurrent protection may be started. The disclosed circuit for battery cell overcurrent protection may replace the TCO protection circuit in the conventional technology, and is less costly. The battery resistance and power consumption of the battery may be reduced. The accuracy of the battery cell overcurrent protection may be improved. Further, the disclosed method and circuit for battery cell overcurrent protection may support high-power discharge in a battery. In some embodiments, the disclosed circuit may avoid adverse effects caused by leakage current when the overcurrent protection is triggered in the conventional technology.

Figure 6:
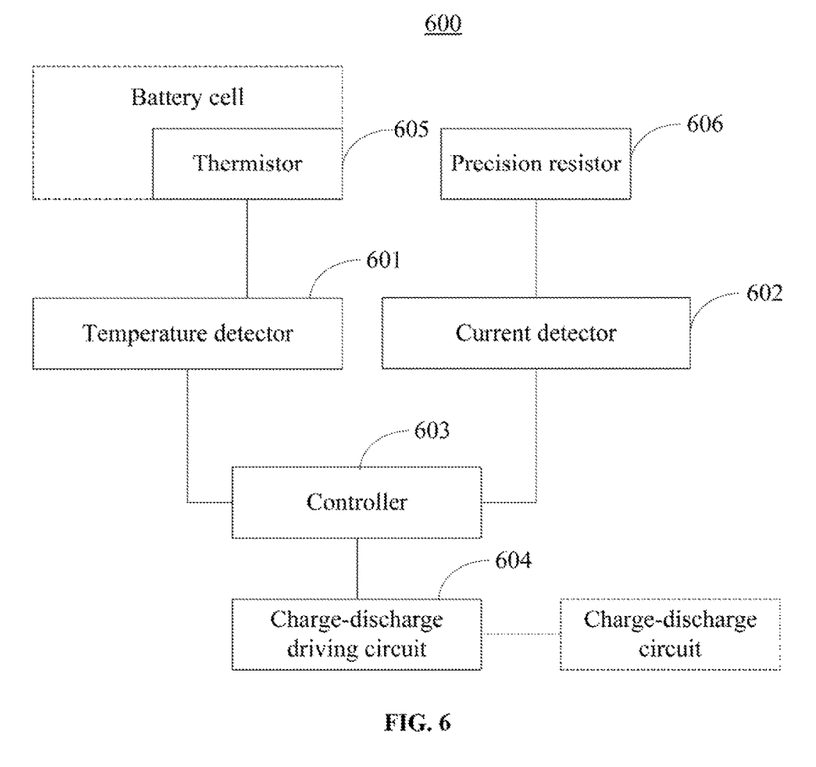
FIG. 6 illustrates a structural diagram of another example of circuit for battery cell overcurrent protection consistent with embodiments of the present disclosure.

FIG. 6 illustrates a structure of another example of circuit 600 for battery cell overcurrent protection. As shown in FIG. 6, the circuit 600 includes a temperature detector 601, a current detector 602, a controller 603, a charge-discharge driving circuit 604, a thermistor 605, and a precision resistor 606.

The temperature detector 601 may detect a present temperature value of the battery cell through the thermistor 605. The thermistor 605 may be arranged over the surface of the battery cell.

The current detector 602 may detect the present electric current value of the battery through the precision resistor 606, coupled to or contained in the current detector 602, and perform an analog-to-digital (AD) conversion on the detected present electric current value, to convert the present electric current value to a suitable electric current value that can be processed by the controller 603.

The charge-discharge driving circuit 604, coupled to the controller 603, may drive the charge-discharge circuit, coupled to the charge-discharge driving circuit 604, to be turned on or off.

The charge-discharge circuit may include a MOSFET. Accordingly, the charge-discharge driving circuit 604 may include a MOSFET driving circuit.

The controller 603 may determine whether the present temperature value of the battery cell, detected by the temperature detector 601, is higher than a lowest threshold temperature value and lower than a highest threshold temperature value. The controller 603 may also, when the present temperature value of the battery cell is higher than the lowest threshold temperature value and lower than the highest threshold temperature value, determine the temperature sub-range within which the present temperature value falls, and determine whether the present electric current value of the battery, detected by the current detector 602, is higher than a threshold current value of the temperature sub-range corresponding to the present temperature value. When the present electric current value of the battery is higher than the threshold current value of the temperature sub-range, the charge-discharge driving circuit 604 may be controlled to turn off the charge-discharge circuit.

The controller 603 may also, when the present temperature of the battery cell, detected by the temperature detector 601, is lower than or equal to the lowest threshold temperature value, or is higher than or equal to the highest threshold temperature value, control the charge-discharge driving circuit 604 to turn off the charge-discharge circuit.

After the charge-discharge circuit is controlled to be turned off, the controller 603 may control the temperature detector 601 and the current detector 602 to detect the present temperature value of the battery cell and the present electric current value of the battery in real-time. The controller 603 may determine whether the present temperature of the battery cell is higher than the lowest threshold temperature value and lower than the first threshold temperature value. When the present temperature value of the battery cell is higher than the lowest threshold temperature value and lower than a first threshold temperature value, and the controller 603 may determine whether the present electric current value of the battery is lower than the threshold current value of the temperature sub-range that corresponds to the lowest threshold temperature value. When the present electric current value of the battery is lower than the threshold current value of the temperature sub-range that corresponds to the lowest threshold temperature value, the controller 603 may control the charge-discharge circuit to turn on again. The first threshold temperature value may be the highest temperature value of the temperature sub-range that corresponds to the lowest threshold temperature value.

Figure 7:
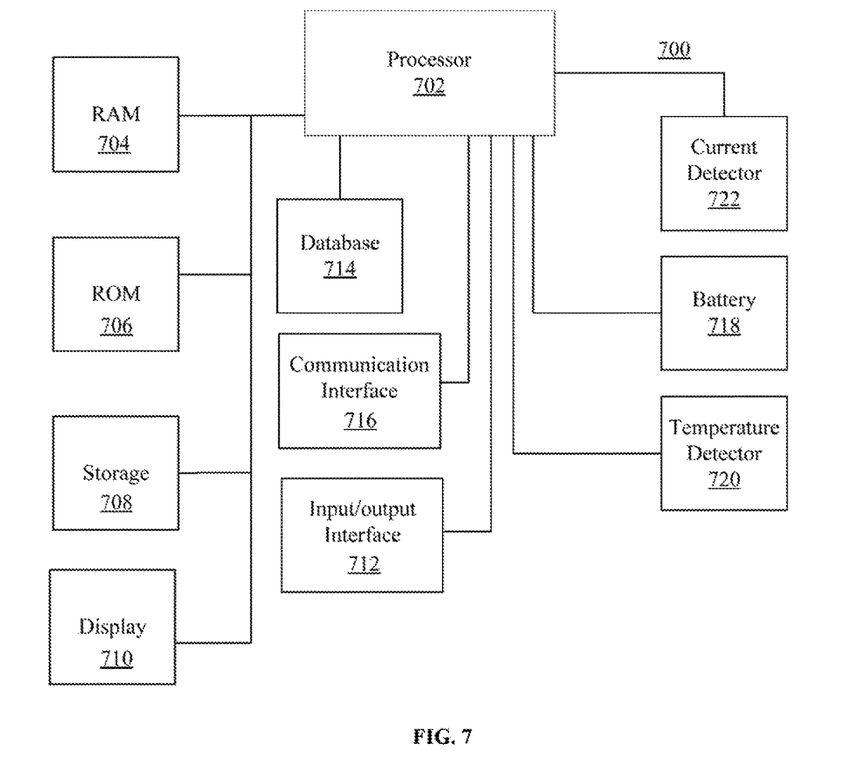
FIG. 7 illustrates a block diagram of an example of electronic device utilizing embodiments of the present disclosure.

FIG. 7 illustrates a block diagram of an example of electronic device 700 consistent with embodiments of the present disclosure. Different components of the electronic device 700 may be configured to perform various functions consistent with the embodiments.

The electronic device 700 may include any appropriately configured computer system, such as a laptop, a tablet, or a mobile phone. As shown in FIG. 7, the electronic device 700 includes a processor 702, a random access memory (RAM) 704, a read-only memory (ROM) 706, a storage 708, a display 710, an input/output interface 712, a database 714, a communication interface 716, a battery 718, a temperature detector 720, and a current detector 722. Other components may be added and certain devices may be removed without departing from the principles of the disclosed embodiments.

The processor 702 may include any appropriate type of general purpose microprocessor, digital signal processor or microcontroller, and application specific integrated circuit (ASIC). The processor 702 may execute sequences of computer program instructions to perform various processes associated with the electronic device 700, such as an overcurrent protection method consistent with the disclosure to protect the battery 718 from overcurrent. The computer program instructions may be stored in a memory of the electronic device 700, where the memory includes one or more of the RAM 704, the ROM 706, and the storage 708. For example, the computer program instructions may be loaded into the RAM 704 for execution by the processor 702 from the read-only memory 706, or from the storage 708. The storage 708 may include any appropriate type of mass storage provided to store any type of information that the processor 702 may need to perform the processes. For example, the storage 708 may include one or more hard disk devices, optical disk devices, flash disks, or other storage devices to provide storage space.

The display 710 may provide information to a user or users of the electronic device 700. The display 710 may include any appropriate type of computer display device or electronic device display (e.g., CRT or LCD based devices). The input/output interface 712 may be provided for users to input information into the electronic device 700 or for the users to receive information from the electronic device 700. For example, the input/output interface 712 may include any appropriate input device, such as a keyboard, a mouse, an electronic tablet, voice communication devices, touch screens, or any other optical or wireless input devices. Further, the input/output interface 712 may receive from and/or send to other external devices.

Further, the database 714 may include any type of commercial or customized database, and may also include analysis tools for analyzing the information in the databases. The communication interface 716 may provide communication connections such that the electronic device 700 may be accessed remotely and/or communicate with other systems through computer networks or other communication networks via various communication protocols, such as transmission control protocol/internet protocol (TCP/IP), hyper text transfer protocol (HTTP), etc.

The battery 718 may provide power to various components of the electronic device 700. The temperature detector 720 is coupled to the processor 702, and may detect a present temperature value of a battery cell of the battery 718 and send to the processor 702 for further processing. The current detector 722 is coupled to the processor 702, and may detect a present electric current value of the battery 718 and send to the processor 702 for further processing. The temperature detector 720 and the current detector 722 are similar to the examples of temperature detector and current detector described above, and thus detailed description thereof is omitted.

Embodiments of the present disclosure provide a circuit for battery cell overcurrent protection. Different current-protection threshold values may be set for different temperature sub-ranges based on the safety requirements of the battery cell. When the present temperature value of the battery cell falls in a certain temperature sub-range, if the present electric current of the battery is higher than the current-protection threshold value corresponding to the temperature sub-range, overcurrent protection may be started. After the overcurrent protection has been started, the temperature value of the battery cell and the electric current value of the battery may continue to be monitored to determine whether the conditions to turn on the charge-discharge circuit are satisfied. When the conditions are satisfied, the charge-discharge circuit may be controlled to be turned on again, and the battery may return to normal operations. The disclosed method for battery cell overcurrent protection may replace the TCO protection method in the conventional technology, and is less costly. The battery resistance and power consumption of the battery may be reduced. The accuracy of the battery cell overcurrent protection may be improved. Further, the disclosed method and circuit for battery cell overcurrent protection may support high-power discharge in a battery.

Embodiments of the present disclosure are described in a progressive manner, each of which is focused on the differences from the other embodiments, and the same similar parts between the various embodiments may be omitted from the description of some embodiments.

In the embodiments provided by the present disclosure, it should be understood that the disclosed method and device may be implemented in other manners. For example, the embodiments of the device described above are merely illustrative. The division of the units/modules is only a logical function division, and there may be other ways to divide the units/modules in actual implementation. For example, multiple units or components may be combined or integrated into another system, or some feature can be omitted or not executed. Further, the coupling, direct coupling, or communication connections shown or discussed may be an indirect coupling or a communication connection through some communication interfaces, devices and/or units. The coupling, direct coupling, or communication connection may be electrical, mechanical, or other suitable forms.

The units/modules/components described as being separated may or may not be physically separate. The units/modules/components shown as units may or may not be physical units, i.e., may be located in one place or may be distributed over a plurality of network elements. Part or all of the elements may be selected according to actual needs to achieve the object of the present disclosure. In addition, the functional units in an embodiment of the present disclosure may be integrated in one processing unit, independently present, or two or more units being integrated in one unit.

The functions can be stored in a computer-readable storage medium if these functions are implemented in the form of software functional units and sold or used as standalone products. Based on this understanding, the technical solution of the present disclosure, either essentially or in part that contributes to the prior art or part of the technical solution, may be embodied in the form of a software product stored in a storage medium. The technical solution may include several instructions to enable a computer device (which can be a personal computer, a server, or a network device, etc.) to perform all or part of the steps described in the various embodiments of the present disclosure. The aforementioned storage medium may include a variety of media capable of storing programs, such as a USB disk, a mobile hard disk, a read-only memory (ROM), a random-access memory (RAM), a magnetic disk, or an optical disk.

In the description of the embodiments, terms of "first", "second", and the like are only used to distinguish different objects and are not intended to suggest or indicate any differences in functions or orders.

The foregoing description of the disclosed embodiments will enable one skilled in the art to make or use the apparatus or method in the present disclosure. Various modifications to these embodiments will be apparent to those skilled in the art, and the generic principles defined herein may be embodied in other embodiments without departing from the spirit or scope of the disclosure. Accordingly, the disclosure is not to be limited to the embodiments shown herein, but is to be accorded the widest scope in the principles and novel features disclosed herein.

What is claimed is:

1. A method comprising:
   detecting, through a temperature detector, a present temperature value of a battery cell of a battery;
   determining, by a processor, whether the present temperature value is higher than a lowest threshold temperature value and lower than a highest threshold temperature value;
   detecting, through a current detector in association with a determination that the present temperature value is higher than the lowest threshold temperature value and lower than the highest threshold temperature value, a present electric current value of the battery;

determining, by the processor, whether the present electric current value is higher than a threshold current value corresponding to the present temperature value; and stopping, by the processor in response to determining that the present electric current value is higher than the threshold current value, a charge-discharge process of the battery cell.

2. The method according to claim 1, further comprising:
determining, in response to determining that the present temperature value is higher than the lowest threshold temperature value and lower than the highest threshold temperature value, a temperature sub-range within which the present temperature value falls,
wherein the threshold current value corresponding to the present temperature value includes a threshold current value corresponding to the temperature sub-range.

3. The method according to claim 1, wherein stopping the charge-discharge process includes turning off a charge-discharge circuit coupled to the battery.

4. The method according to claim 1, further comprising:
in association with a determination that the present temperature value is lower than or equal to the lowest threshold temperature value or is higher than or equal to the highest threshold temperature value, stopping the charge-discharge process.

5. The method according to claim 1, further comprising:
detecting, after the charge-discharge process is stopped, the present temperature value and the present electric current value in real-time;
determining whether the present temperature value is higher than the lowest threshold temperature value and lower than a regional threshold temperature value;
determining, in association with a determination that the present temperature value is higher than the lowest threshold temperature value and lower than the regional threshold temperature value, whether the present electric current is lower than a threshold current value corresponding to the lowest threshold temperature value; and
restarting, in response to determining that the present electric current is lower than the threshold current value corresponding to the lowest threshold temperature value, the charge-discharge process.

6. The method according to claim 1, wherein detecting the present temperature value includes detecting the present temperature value in real-time using a thermistor arranged over the battery cell.

7. The method according to claim 1, wherein detecting the present electric current value includes detecting the present electric current value using a precision resistor coupled to the battery.

8. An apparatus comprising:
a controller;
a temperature detector coupled to the controller, the temperature detector detecting a present temperature value of a battery cell of a battery; and
a current detector coupled to the controller, the current detector detecting a present electric current value of the battery,
wherein the controller:
determines whether the present temperature value is higher than a lowest threshold temperature value and lower than a highest threshold temperature value and, in association with a determination that the present temperature value is higher than the lowest threshold temperature value and lower than the highest threshold temperature value, determines a present electric current value; and
determines whether the present electric current value is higher than a threshold current value corresponding to the present temperature value and, in response to determining that the present electric current value is higher than the threshold current value, controls to stop a charge-discharge process of the battery cell.

9. The apparatus according to claim 8, wherein:
the controller further determines, in response to determining that the present temperature value is higher than the lowest threshold temperature value and lower than the highest threshold temperature value, a temperature sub-range within which the present temperature value falls, and
the threshold current value corresponding to the present temperature value includes a threshold current value corresponding to the temperature sub-range.

10. The apparatus according to claim 8, wherein the controller further controls a charge-discharge circuit to turn off to stop the charge-discharge process.

11. The apparatus according to claim 8, wherein the controller further controls to stop the charge-discharge process in association with a determination that the present temperature value is lower than or equal to the lowest threshold temperature value or is higher than or equal to the highest threshold temperature value.

12. The apparatus according to claim 8, wherein the controller further:
detects, after the charge-discharge process is stopped, the present temperature value and the present electric current value in real-time;
determines whether the present temperature value is higher than the lowest threshold temperature value and lower than a regional threshold temperature value;
determines, in association with a determination that the present temperature value is higher than the lowest threshold temperature value and lower than the regional threshold temperature value, whether the present electric current is lower than a threshold current value corresponding to the lowest threshold temperature value; and
restarts, in response to determining that the present electric current is lower than the threshold current value corresponding to the lowest threshold temperature value, the charge-discharge process.

13. The apparatus according to claim 8, wherein the temperature detector detects the present temperature value in real-time using a thermistor arranged over the battery cell.

14. The apparatus according to claim 8, wherein the current detector detects the present electric current value using a precision resistor coupled to the battery and performs an analog-to-digital conversion to convert the present electric current value to a value to be processed by the controller.

15. An apparatus comprising:
a battery;
a processor powered by the battery;
a memory;
a temperature detector coupled to the processor, the temperature detector detecting a present temperature value of a battery cell of the battery; and
a current detector coupled to the processor, the current detector detecting a present electric current value of the battery,
wherein code stored in the memory and executed by the processor:

determines whether the present temperature value is higher than a lowest threshold temperature value and lower than a highest threshold temperature value and, in association with a determination that the present temperature value is higher than the lowest threshold temperature value and lower than the highest threshold temperature value, determines a present electric current value; and determines whether the present electric current value is higher than a threshold current value corresponding to the present temperature value and, in response to determining that the present electric current value is higher than the threshold current value, controls to stop a charge-discharge process of the battery cell.

16. The apparatus according to claim 15, wherein:
the code further determines, in response to determining that the present temperature value is higher than the lowest threshold temperature value and lower than the highest threshold temperature value, a temperature sub-range within which the present temperature value falls, and
the threshold current value corresponding to the present temperature value includes a threshold current value corresponding to the temperature sub-range.

17. The apparatus according to claim 15, wherein the code further controls a charge-discharge circuit to turn off to stop the charge-discharge process.

18. The apparatus according to claim 15, wherein the codes further controls to stop the charge-discharge process in association with a determination that the present temperature value is lower than or equal to the lowest threshold temperature value or is higher than or equal to the highest threshold temperature value.

19. The apparatus according to claim 15, wherein the code further:
detects, after the charge-discharge process is stopped, the present temperature value and the present electric current value in real-time;
determines whether the present temperature value is higher than the lowest threshold temperature value and lower than a regional threshold temperature value;
determines, in association with a determination that the present temperature value is higher than the lowest threshold temperature value and lower than the regional threshold temperature value, whether the present electric current is lower than a threshold current value corresponding to the lowest threshold temperature value; and
restarts, in response to determining that the present electric current is lower than the threshold current value corresponding to the lowest threshold temperature value, the charge-discharge process.

20. The apparatus according to claim 15, wherein the temperature detector detects the present temperature value in real-time using a thermistor arranged over the battery cell.

* * * * *